(12) United States Patent
Li et al.

(10) Patent No.: US 11,249,850 B1
(45) Date of Patent: *Feb. 15, 2022

(54) CLUSTER DIAGNOSTICS DATA FOR DISTRIBUTED JOB EXECUTION

(71) Applicant: Snowflake Inc., Bozeman, MT (US)

(72) Inventors: Bing Li, Foster City, CA (US); Zihan Li, Mountain View, CA (US); Edward Ma, San Jose, CA (US); Mingli Rui, San Ramon, CA (US); Srinath Shankar, Belmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,847

(22) Filed: Aug. 11, 2021

Related U.S. Application Data (63) Continuation of application No. 17/218,277, filed on Mar. 31, 2021, now Pat. No. 11,113,151, which is a continuation of application No. 17/161,989, filed on Jan. 29, 2021, now Pat. No. 11,030,046.

(60) Provisional application No. 63/136,341, filed on Jan. 12, 2021.

(51) Int. Cl.
*G06F 16/21* (2019.01)
*G06F 11/14* (2006.01)
*G06F 16/215* (2019.01)
*G06F 9/50* (2006.01)
*G06F 16/28* (2019.01)

(52) U.S. Cl.
CPC ........ *G06F 11/1435* (2013.01); *G06F 9/5027* (2013.01); *G06F 16/215* (2019.01); *G06F 16/28* (2019.01); *G06F 2201/80* (2013.01); *G06F 2201/82* (2013.01); *G06F 2209/505* (2013.01)

(58) Field of Classification Search
CPC ..... G06F 11/1435; G06F 16/215; G06F 16/28
See application file for complete search history.

(56) References Cited

U.S. PATENT DOCUMENTS

| 10,979,281 | B2* | 4/2021 | Arora .................... H04L 43/028 |
| 11,030,046 | B1 | 6/2021 | Li et al. |
| 11,113,151 | B1 | 9/2021 | Li et al. |
| 2004/0003451 | A1 | 2/2004 | Pfohe et al. |
| 2004/0034510 | A1* | 2/2004 | Pfohe .................. G06F 11/3495 702/187 |
| 2008/0215917 | A1 | 9/2008 | Needham et al. |

OTHER PUBLICATIONS

"U.S. Appl. No. 17/161,989, Notice of Allowance dated Mar. 30, 2021", 21 pgs.

* cited by examiner

*Primary Examiner* — Loc Tran
(74) *Attorney, Agent, or Firm* — Schwegman Lundberg & Woessner, P.A.

(57) ABSTRACT

A shared database platform can interface with a cluster computing platform over a network through a database connector and one or more cluster connectors. The data transferred over the network can include telemetry metadata that can be distributed to execution nodes of the cluster computing platform for generation and transmission of cluster data to the shared database platform.

15 Claims, 6 Drawing Sheets

CLUSTER DIAGNOSTICS DATA FOR DISTRIBUTED JOB EXECUTION

PRIORITY APPLICATIONS

This application is a Continuation of U.S. patent application Ser. No. 17/218,277, filed on Mar. 31, 2021, which is a Continuation of U.S. patent application Ser. No. 17/161,989, filed Jan. 29, 2021, which claims the benefit of priority to U.S. Provisional Application Ser. No. 63/136,341, filed Jan. 12, 2021, the disclosures of which are incorporated herein by reference in their entireties.

TECHNICAL FIELD

The present disclosure generally relates to special-purpose machines that manage databases and improvements to such variants and to the technologies by which such special-purpose machines become improved compared to other special-purpose machines for managing diagnostic data for distributed job execution.

BACKGROUND

Distributed processing can be used to create analytical compute sources to analyze data. Some of these distributed computing systems include a cluster of nodes including a driver node and multiple execution nodes that function in concert per the driver node's instructions to complete data processing tasks. While these distributed systems enable powerful computing, inefficiencies such as bottlenecks can still occur. Furthermore, the logging and diagnostic information for the cluster of nodes is complicated and inconvenient for end-users because there are many various node cluster versions, and the end-user (e.g., customer) may have no experience nor access privilege to collect the information for diagnosis and tracking of processing in the distributed node cluster.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details In general, well-known instruction instances, protocols, structures, and techniques are not necessarily shown in detail As discussed, enabling logging and diagnostic information for distributed clusters of nodes can be problematic. In some example embodiments, if the end-user encounters an issue or an error, the user then (1) reproduces the error with an additional option on the diagnostic system set as "enable_diag=true", and then, (2) while this option is set to true, log data from with a unique application identifier (ID) output after the cluster job (e.g., Apache Spark job). The user can then send the unique ID with cluster data to a network database for analysis by administrators of the database to further investigate the issue. In the below examples, Apache Spark is discussed as the distributed node cluster that can connect to a distributed data warehouse system through a cluster connector. In some example embodiments, the Spark connector runs as a Spark cluster process and the spark connector plug-in is configured to connect to the distributed data warehouse system using a database connection, such as JDBC. Although Apache Spark and Java Database Connectivity (JDBC) connector interfaces are discussed here as examples, it is appreciated that other types of cluster computing environments and database connectors can be implemented in a similar manner. A spark connector runs in the distributed Spark cluster environment (e.g., external to the database environment). If an end-user encounters some issues or errors, the database administrators of the distributed database generally need to help the end-user diagnose the problem. The diagnosis for distributed cluster computing systems that are connected to distributed databases over a network is complex and inconvenient, and can require collection of the following: (1) what version of the cluster of nodes (e.g., what version of Spark), what version of the spark connector plug-in, what Scala (programming language) version, and what application or job version was submitted, (2) what distributed database JDBC version, (3) what type or configuration of cluster has been implemented, (4) what type of distributed database user account the end-user is using, (5) whether a stack-trace has occurred and if so, what was the result, (6) whether any error messages have been generated, and if so, what errors, (7) whether there are cluster connector logs available (e.g., logs that include spark driver and spark executors' log) (8) the Spark cluster operational parameters and configuration (e.g., total memory, central processing unit core count, etc.), (9) and/or estimated data size for dataframe and spark partition.

Requiring collection of the above data by the end-user is generally complex and can frustrate the users, which causes a very poor user experience. It is typically very difficult for users to collect item (7) (spark connector logs) because there are many kinds of spark clusters, such as on-premise cluster, on-premise cluster on cloud infrastructure, yarn cluster, k8s cluster, DataBrick, Amazon EMR, Qubole, etc., and each requires different operations and knowledge to perform the data collections.

In contrast, with the Cluster Diagnostic System implemented, when the customer meets an issue, the end-user then: (1) reproduces the issue with an additional option activated (e.g., "enable_diag=true"), after which (2) log data and a unique ID are generated and sent to the database. The database administrators can then analyze and query the log data and help investigate based on the unique ID of the distributed cluster system.

Figure 1:
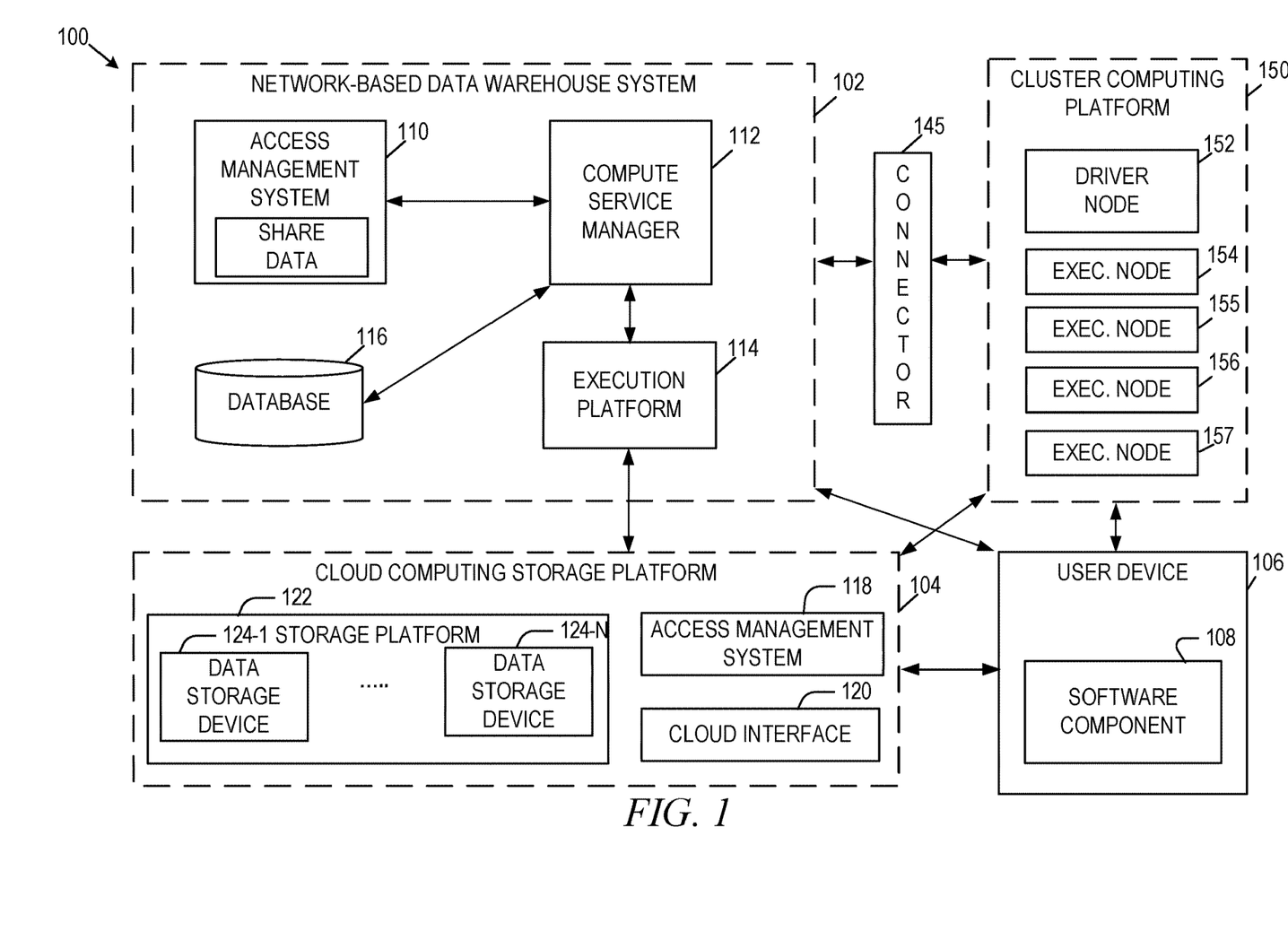
FIG. 1 illustrates an example computing environment in which a network-based data warehouse system can implement cluster computing using a metadata connector, in accordance with some embodiments of the present disclosure.

FIG. 1 illustrates an example shared data processing platform 100 in which a network-based data warehouse system 102 functions as a data source for a cluster computing platform 150 connected by way of a database connector interface, such as an application programming interface (API) connector 145, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services®), and a user device 106. The network-based data warehouse system 102 is a network-based system used for storing and accessing data (e.g., internally storing data, accessing external remotely located data) in a multitenant integrated manner, and reporting and analysis of the integrated data from the one or more disparate sources (e.g., the cloud computing storage platform 104), where additional analytical computing can be performed by the cluster computing platform 150. The cloud computing storage platform 104 comprises a plurality of computing machines and provides on-demand computer system resources such as data storage and computing power to the network-based data warehouse system 102.

The user device 106 (e.g., a user device such as a laptop computer) comprises one or more computing machines (e.g., a client device such as a laptop computer) that execute a software component 108 (e.g., browser accessed cloud service, native app such as a mobile app for a mobile operating system) to provide additional functionality to users of the network-based data warehouse system 102.

The software component 108 comprises a set of machine-readable instructions (e.g., code) that, when executed by the user device 106, cause the user device 106 to provide certain functionality. The software component 108 may operate on input data and generate result data based on processing, analyzing, or otherwise transforming the input data. As an example, the software component 108 can be a browser that accesses a cloud run customer application on the cluster computing platform 150 for computation by a driver node 152 and executor nodes 154-157, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, application container clusters) in the execution platform 114. The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of the data managed by the shared data processing platform 100. The database 116 stores data pertaining to various functions and aspects associated with the network-based data warehouse system 102 and its users. For example, data against which queries can be executed by a customer application running on cluster computing platform 150 can be stored in database 116 as internal data or in a storage platform 122 as external data.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. Although two data storage devices 124-1 and 124-n are shown in FIG. 1, execution platform 114 is capable of communicating with any number of data storage devices as part of an elastic storage system. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (00M) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a cloud interface 120 (e.g., API gateway for cloud computing storage platform 104). As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The cloud interface 120 handles tasks involved in accepting and processing concurrent API calls, including traffic management, authorization and access control, monitoring, and API version management. The cloud interface 120 provides Hypertext Transfer Protocol (HTTP) proxy service for creating, publishing, maintaining, securing, and monitoring APIs (e.g., Representational State Transfer (REST) APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner (e.g., cloud computing storage platform 104 is an external network platform, such as Amazon AWS, separately managed but linked to network-based data warehouse system 102). This architecture supports dynamic changes to the network-based data warehouse system 102 based on the changing data storage/retrieval needs as well as the changing needs of the users and systems accessing the shared data processing platform 100. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

The cluster computing platform 150 is a cluster computing environment that can extend the computing analysis of the network-based data warehouse system 102. For example, whereas the network-based data warehouse system 102 can be configured to function with the cloud computing storage platform 104 to enable a decoupled data warehouse that can scale, the cluster computing platform 150 can be a big data or no-SQL platform (e.g., Apache Spark, Hadoop, Cassandra) that implements a driver node 152 and a plurality of executor nodes 154-157 to perform distributed computing tasks (e.g., data analysis). In some example embodiments, the network-based data warehouse system 102 and the cloud computing storage platform 104 function as a single entity, and the cluster computing platform 150 is agnostic to the decoupling and functions of the single entity. For instance, the network-based data warehouse system 102 and the cloud computing storage platform 104 can be implemented as a Snowflake data source to an Apache Spark Cluster (e.g., an example embodiment of the cluster computing platform 150), where the two platforms are connected via API connector 145 such as JDBC. Although the API connector 145 is shown between the network-based data warehouse system 102 and the cluster computing platform 150, it is appreciated that the API connector 145 can be integrated within the network-based data warehouse system 102, as discussed in further detail below with reference to FIG. 2.

Further, compute service manager 112, database 116, execution platform 114, cloud computing storage platform 104, cluster computing platform 150, and user device 106 are shown in FIG. 1 as individual components. However, each of compute service manager 112, database 116, execution platform 114, cloud computing storage platform 104, and cluster computing platform 150 may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries from cluster computing platform 150) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, may be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
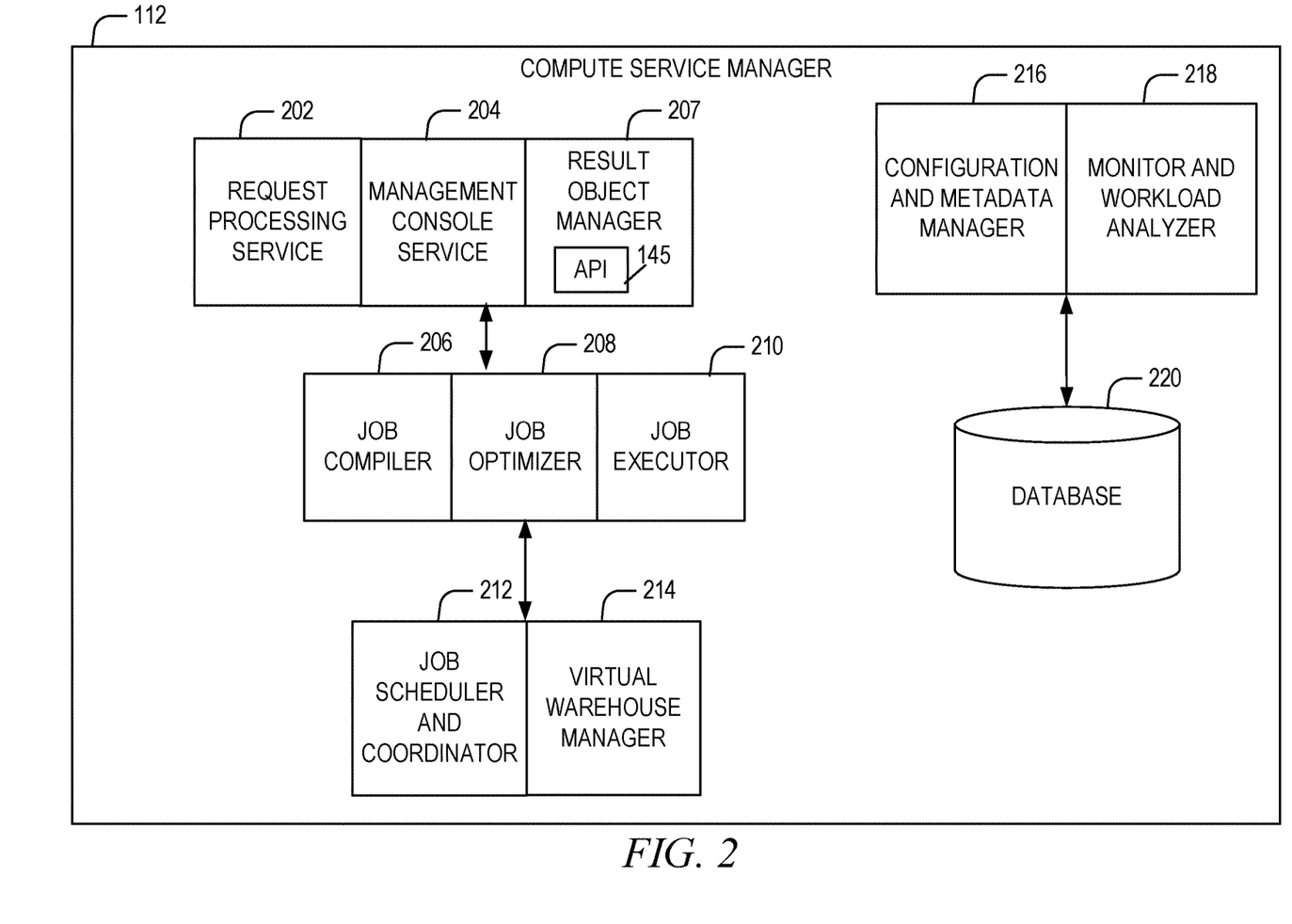
FIG. 2 is a block diagram illustrating components of a compute service manager, in accordance with some embodiments of the present disclosure.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The result object manager 207 is configured to generate serialized result files for storage on a staging platform and generate the object metadata set, which is a metadata list describing the result files stored in the staging platform. The result object manager 207 includes the API connector 145 as a relational database connection interface for facilitating data transfers (e.g., receiving queries and transmitting result data) between the network-based data warehouse system 102 and the cluster computing platform 150. For example, a customer application running on cluster computing platform 150 can issue a query to the network-based data warehouse system 102, which is directed to the API connector 145 for parsing and forwarding as a job request to the request processing service. Although the API connector 145 is illustrated as between the cluster computing platform 150 and the network-based data warehouse system 102, in some example embodiments the API connector 145 is installed in the network-based data warehouse system 102 to send and receive data to the cluster computing platform 150, which may be an externally run cluster computing platform 150 managed by a different company (e.g., cluster computing platform 150 can be an Apache Spark cluster hosted by the Databricks® platform or other Spark platforms).

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and then processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
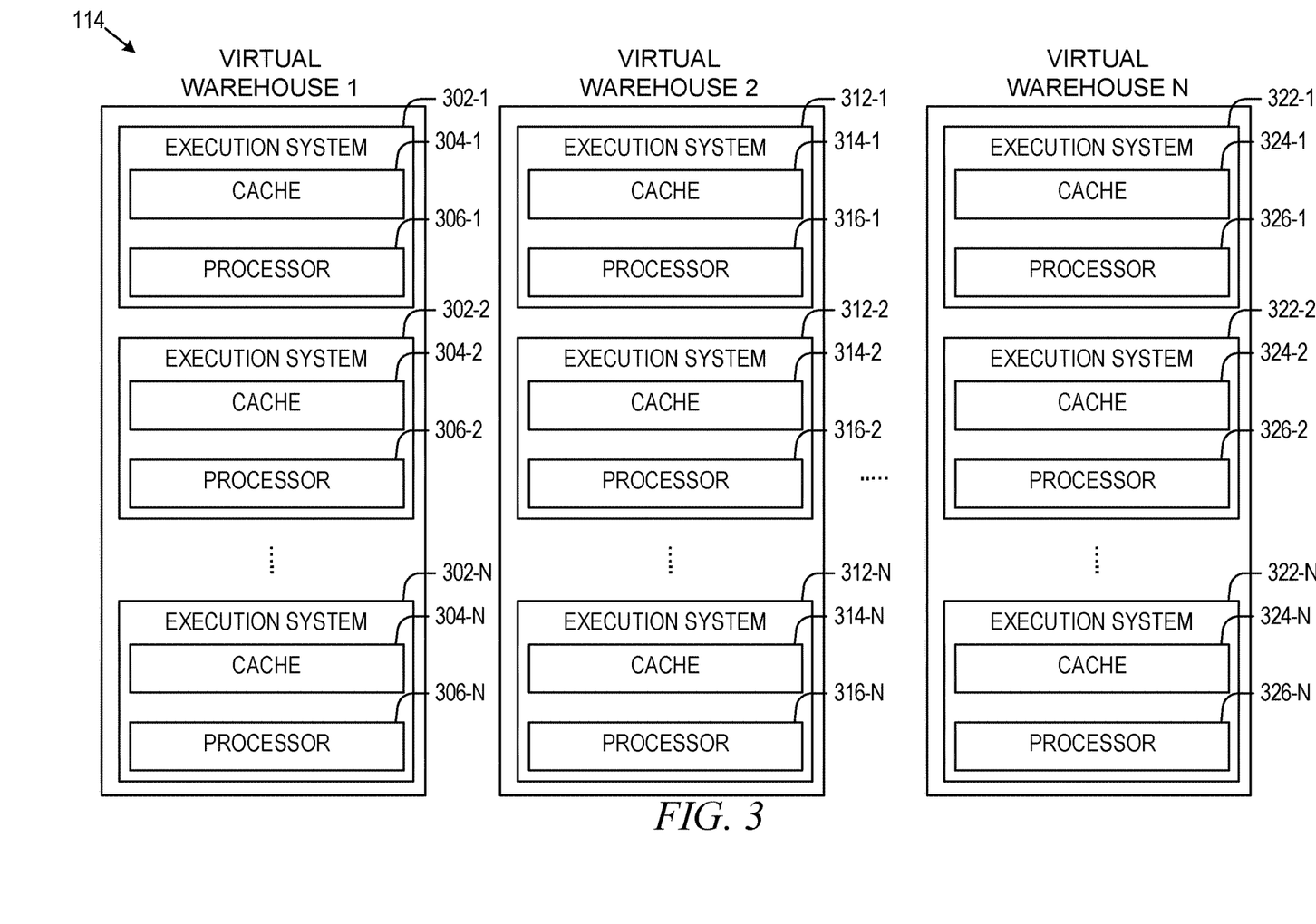
FIG. 3 is a block diagram illustrating components of an execution platform, in accordance with some embodiments of the present disclosure.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real-time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with an executor node in a virtual warehouse of another user (e.g., consumer account user), such that the another user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers, and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or storage platform 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the LRU replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input/output (I/O) operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
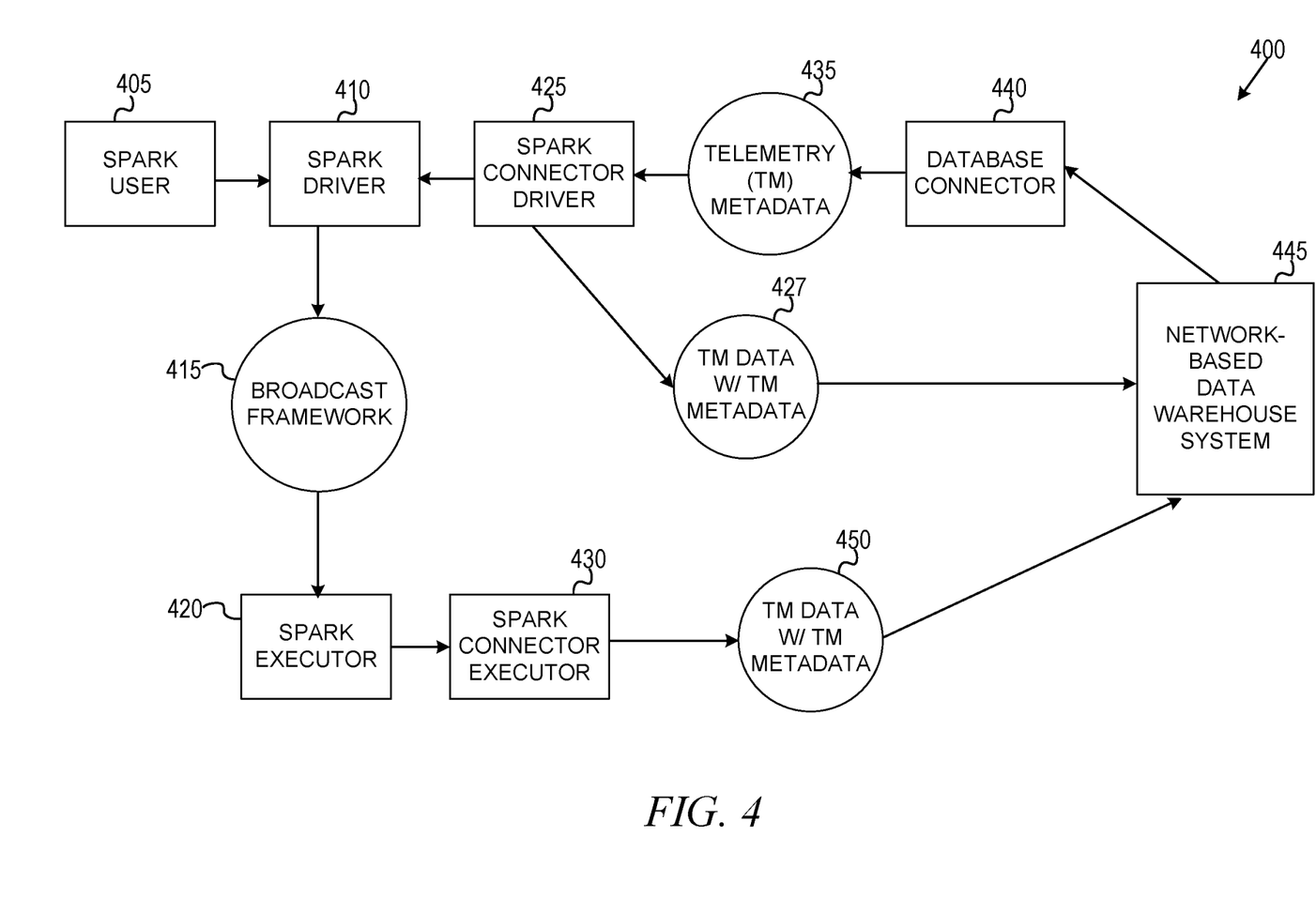
FIG. 4 shows an example cluster computing dataflow architecture implementing the cluster diagnostic system, in accordance with some embodiments of the present disclosure.

FIG. 4 shows an example cluster computing dataflow architecture 400 implementing the cluster diagnostic system, according to some example embodiments. In the example illustrated in FIG. 4, an Apache Spark cluster computing system is discussed as an example, although it is appreciated that other cluster computing systems can likewise be implemented to perform cluster diagnostics using the cluster diagnostic system. Generally, Spark is a driver/executor model cluster that runs a user's application. This driver and executor can be implemented as a single logical unit to which a job or an application is distributed. Each spark executor can be implemented as an isolated java virtual machine (JVM) process serving one spark application/job only, according to some example embodiments. The spark executors are terminated when the spark application or job is complete. In some example embodiments where the cluster diagnostic system has enabled logging for the spark job or application, the logging files will reside on the machine in which the executor runs (e.g., within the network or compute instances implementing the cluster), according to some example embodiments.

In addition to the database API connector 145 (e.g., JDBC), in some example embodiments, a network-based data warehouse system implements a Spark connector on each of the driver and executor nodes in the cluster. The Spark connector can be implemented as a plug-in for Apache Spark to read from the network-based data warehouse system or write to one or more databases of the network-based data warehouse system. In some example embodiments, the Spark connector is a plug-in that is agnostic to whether it is implemented in an executor or a driver; that is, for example, the plug-in can include libraries or sets of instructions that enable the plug-in to function and perform the same actions whether run from an executor node or driver node.

With reference to FIG. 4, the Spark user 405 can connect to the Spark cluster to write or create an application (e.g., a Spark job), and can then submit the application to the Spark cluster for execution. The spark driver 410 receives the application and invokes a spark connector driver 425 to implement the actual read and write job for database data from the network-based data warehouse system 445 provided through the database connector 440.

The read and write job is split into multiple small process units called partitions (tasks). The spark driver 410 distributes the tasks to one or more spark executors 420 via a broadcast framework 415. Each spark executor receives one task at a time and processes the task, followed by receiving a next task from the broadcast framework 415, until all tasks are processed (e.g., all tasks are processed by the multiple executors spawned for a given spark job).

In some example embodiments, when the spark user 405 encounters an application or job issue (e.g., one or more errors encountered in the driver or executors), the spark user 405 then reproduces the issue with an additional cluster diagnosis parameter in the application/job set to true (e.g., "enable_diagnosis=true", where the default setting is false or inactive). The spark driver 410 then receives the application with the diagnosis setting now set to true. The spark driver 410 parses the application and identifies the diagnosis setting as now set to true, and in response retrieves telemetry metadata 435 from the network-based data warehouse system 445. The telemetry metadata comprises credential or access authentication data (e.g., JDBC session token, and/or additional credential/access data) for communicating with the telemetry service of the network-based data warehouse system (e.g., an electronic messaging service communicating with servers over a rest API). In some example embodiments, the spark connector driver 425 generates logging data that is sent as telemetry message 427, which includes logging and telemetry metadata for access to the network-based data warehouse system 445.

Further, the spark driver 410 passes the telemetry metadata to the spark connector executors 430 via the broadcast framework 415 and the spark executors 420 when the diagnostic setting is set to true. For each of the spark connector executors, if the setting is set to true, each of the spark connector executors enables logging to be collected and sent to the telemetry service of the network-based data warehouse system 445. For example, the telemetry messages for a given spark connector executor 430 can be sent as the telemetry message 450, which includes both the logging and the telemetry metadata for access to the network-based data warehouse system 445.

In some example embodiments, both the spark connector driver 425 and the spark connector executor 430 send spark connector log data (as telemetry message data) to the telemetry service of the network-based data warehouse system 445, instead of the internal or native logging system of Spark such as LOG4J. In some example embodiments, a wrapper for the logger object is introduced. If the cluster diagnosis setting for a given job is enabled, the wrapper is configured to pass the log request to the logger object, and then send the log entry as a telemetry service message to the network-based data warehouse system 445 using the telemetry metadata. The telemetry metadata and credentials are used to access the telemetry network service and send telemetry messages to the network-based data warehouse system 445 (e.g., over a network, REST-API). Accordingly, the spark driver 410 retrieves the telemetry metadata 435 through the database connector 440 for distribution to the executors to transmit the telemetry messages from the executors.

Figure 5:
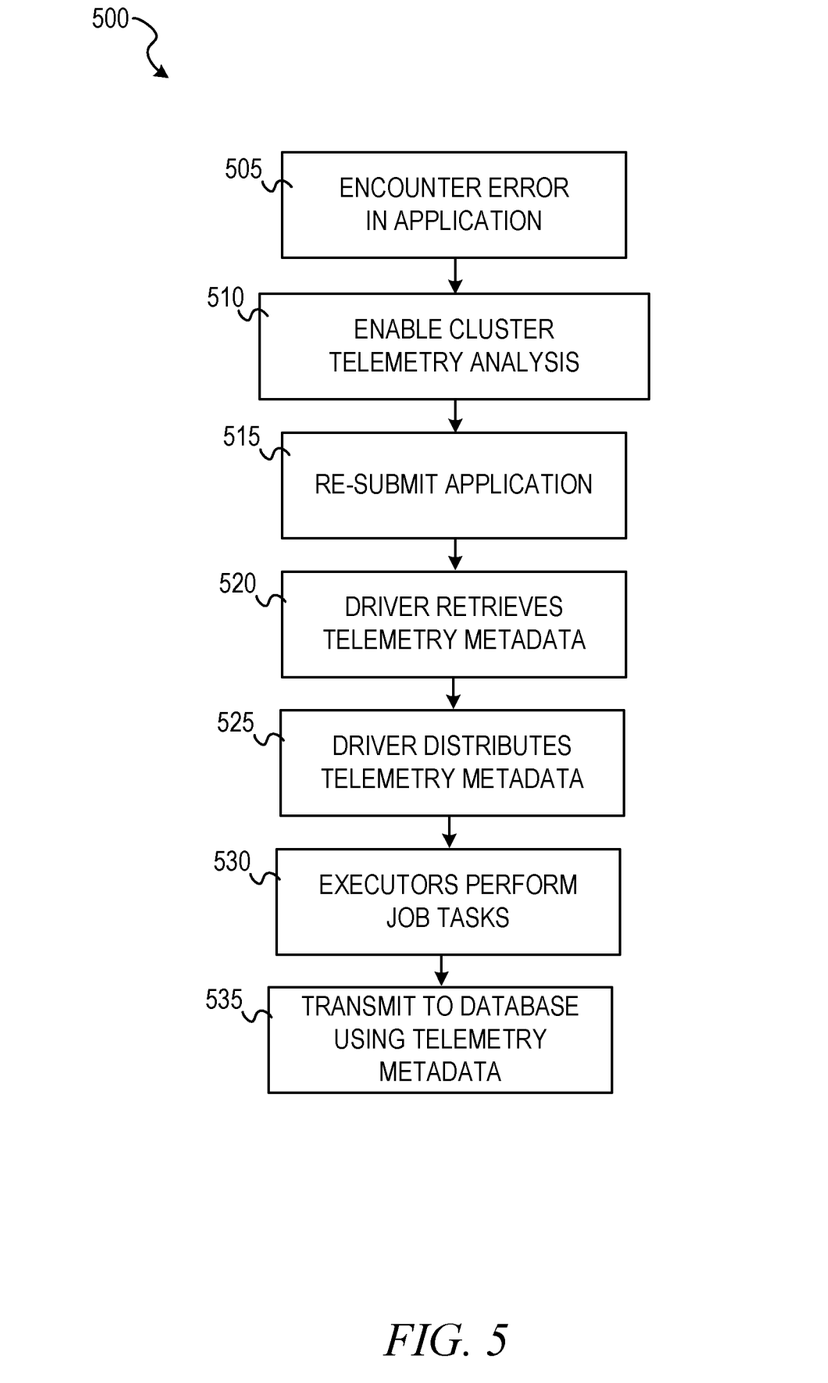
FIG. 5 shows a flow diagram of a method for implementing a cluster diagnosis system, in accordance with some embodiments of the present disclosure.

FIG. 5 shows a flow diagram of a method 500 for implementing a cluster diagnosis system, according to some example embodiments. At operation 505, an error in the application is encountered. For example, one or more issues of an application or job submitted by a spark user to the cluster computing system is encountered. At operation 510, the spark user sets the cluster telemetry analysis setting to true in the application or job. At operation 515, the application is resubmitted to the cluster computing environment. At operation 520, the driver retrieves the telemetry metadata (e.g., session token, credentials) from the database system (e.g., via the database JDBC connector). At operation 525, the driver distributes the telemetry metadata to the cluster executors. At operation 530, the executors perform one or more job tasks for the application. At operation 535, telemetry message data with log data accompanied by telemetry metadata for access to the network database is transmitted to the database system by the cluster (e.g., driver data from the driver, executor data from one or more of the executors), according to some example embodiments. For example, at operation 535, the spark connector driver 425 transmits the telemetry message 427 to the network-based data warehouse system 445; further, at operation 535, the spark connector executor 430 transmits telemetry message 450 to the network-based data warehouse system 445.

Figure 6:
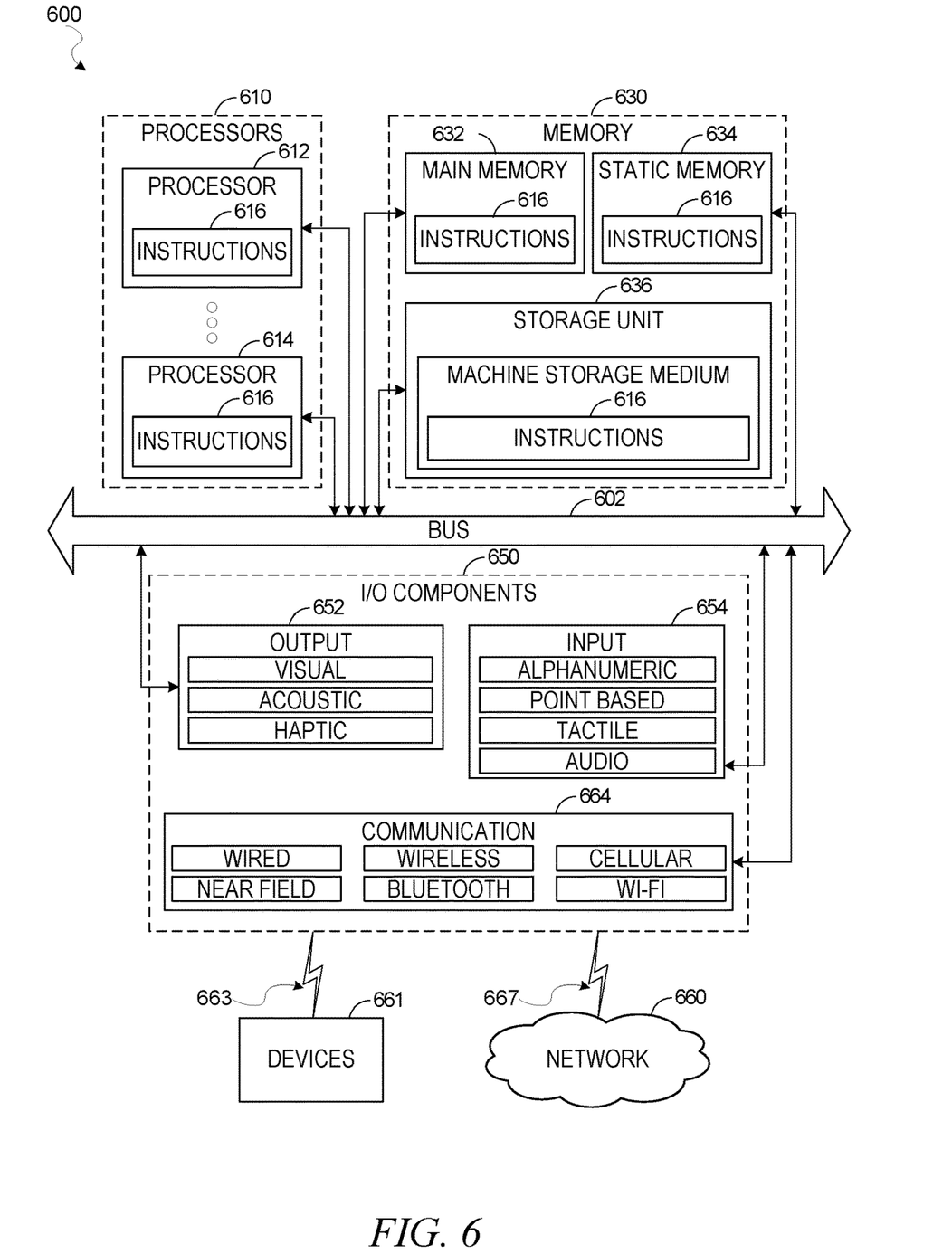
FIG. 6 illustrates a diagrammatic representation of a machine in the form of a computer system within which a set of instructions may be executed for causing the machine to perform any one or more of the methodologies discussed herein, in accordance with some embodiments of the present disclosure.

In some example embodiments, each cluster application (e.g., Spark job) has a unique ID (e.g., spark application ID). In some example embodiments, each telemetry message sent to the telemetry service can include the unique ID. The telemetry message data can be stored in a credible data store for the specific spark job. In some example embodiments, each telemetry message further includes metadata:

spark application_id: (value),
execution_id: (value),
executor_id: (value),
partition_id: (value),
sequencer (value),
log_level: trace,
log_message: logging entry FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute any one or more operations of any of the dataflows and/or methods discussed above. In this way, the instructions 616 transform a general, non-programmed machine into a particular machine 600 (e.g., the user device 106, the access management system 110, the compute service manager 112, the execution platform 114, the access management system 118, the cloud interface 120) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and I/O components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 660 or devices 661 via a coupling 667 and a coupling 663, respectively. For example, the communication components 664 may include a network interface component or another suitable device to interface with the network. In further examples, the communication components 664 may include wired communication components, wireless communication components, cellular communication components, and other communication components to provide communication via other modalities. The devices 661 may be another machine or any of a wide variety of peripheral devices (e.g., a peripheral device coupled via a universal serial bus (USB)). For example, as noted above, the machine 600 may correspond to any one of the user device 106, the access management system 110, the compute service manager 112, the execution platform 114, the access management system 118, the cloud interface 120.

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 660 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 660 or a portion of the network 660 may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE)

standard, others defined by various standard-setting organizations, other long-range protocols, or other data transfer technology.

The instructions 616 may be transmitted or received over the network 660 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via a coupling (e.g., a peer-to-peer coupling) to the devices 661. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the FIG. 4 and FIG. 5 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following are example embodiments:

Example 1. A method comprising: receiving, by a computing cluster, an application for processing by nodes of the computing cluster, the nodes including a driver node and a plurality of execution nodes for processing of tasks of the application; distributing, by the driver node, the tasks of the application for processing by the plurality of execution nodes; processing the tasks by the plurality of execution nodes; identifying, by the computing cluster, one or more errors in the application received by the computing cluster; in response to the one or more errors, receiving, by the driver node, telemetry metadata for access to a telemetry network service of a distributed database that provides data to the computing cluster through a database connector, the driver node receiving the telemetry metadata through the database connector of the distributed database; and distributing, by the driver node, the telemetry metadata to the plurality of execution nodes for re-processing.

Example 2. The method of example 1, further comprising: re-processing, by the plurality of execution nodes, the tasks of the application; and transmitting, by the plurality of execution nodes, to the telemetry network service of the distributed database, log data that is generated by the plurality of execution nodes while re-processing the tasks of the application.

Example 3. The method of any of examples 1 or 2, wherein the log data is transmitted to the telemetry network service by one or more database connectors integrated in one or more of the plurality of execution nodes.

Example 4. The method of any of examples 1-3, further comprising: transmitting, by the driver node, to the telemetry network service of the distributed database, additional log data that is generated by the driver node while processing the application.

Example 5. The method of any of examples 1-4, wherein the additional log data is transmitted to the telemetry network service by a driver database connector integrated in the driver node.

Example 6. The method of any of examples 1-5, further comprising: determining, by the driver node, that a telemetry setting is active in the application.

Example 7. The method of any of examples 1-6, further comprising: in response to the telemetry setting being active, bypassing a native logging service of the computing cluster using a wrapper.

Example 8. The method of any of examples 1-7, further comprising: in response to the telemetry setting being active, passing a log request to a logger object of the wrapper.

Example 9. The method of any of examples 1-8, wherein the logger object transmits the log data to the telemetry network service of the distributed database using the telemetry metadata for access to a telemetry network service.

Example 10. The method of any of examples 1-9, wherein the telemetry setting is set by default in the application to inactive and log data is not transmitted to the telemetry network service by the computing cluster while the telemetry setting is set to inactive.

Example 11. The method of any of examples 1-10, wherein the telemetry network service is an electronic message network service of one or more servers of the distributed database.

Example 12. A system comprising: one or more processors of a machine; and a memory storing instructions that, when executed by the one or more processors, cause the machine to perform operations comprising: receiving, by a computing cluster, an application for processing by nodes of the computing cluster, the nodes including a driver node and a plurality of execution nodes for processing of tasks of the application; distributing, by the driver node, the tasks of the application for processing by the plurality of execution nodes; processing the tasks by the plurality of execution nodes; identifying, by the computing cluster, one or more errors in the application received by the computing cluster; in response to the one or more errors, receiving, by the driver node, telemetry metadata for access to a telemetry network service of a distributed database that provides data to the computing cluster through a database connector, the driver node receiving the telemetry metadata through the database connector of the distributed database; and distributing, by the driver node, the telemetry metadata to the plurality of execution nodes for purposes of re-processing.

Example 13. The system of example 12, the operations further comprising: re-processing, by the plurality of execution nodes, the tasks of the application; and transmitting, by the plurality of execution nodes, to the telemetry network service of the distributed database, log data that is generated by the plurality of execution nodes while re-processing the tasks of the application.

Example 14. The system of any of examples 12 or 13, wherein the log data is transmitted to the telemetry network service by one or more database connectors integrated in one or more of the plurality of execution nodes.

Example 15. The system of any of examples 12-14, the operations further comprising: transmitting, by the driver node, to the telemetry network service of the distributed database, additional log data that is generated by the driver node while processing the application.

Example 16. The system of any of examples 12-15, wherein the additional log data is transmitted to the telemetry network service by a driver database connector integrated in the driver node.

Example 17. The system of any of examples 12-16, the operations further comprising: determining, by the driver node, that a telemetry setting is active in the application.

Example 18. The system of any of examples 12-17, the operations further comprising: in response to the telemetry setting being active, bypassing a native logging service of the computing cluster using a wrapper.

Example 19. A machine storage medium embodying instructions that, when executed by a machine, cause the machine to perform operations comprising: receiving, by a computing cluster, an application for processing by nodes of the computing cluster, the nodes including a driver node and a plurality of execution nodes for processing of tasks of the application; distributing, by the driver node, the tasks of the application for processing by the plurality of execution nodes; processing the tasks by the plurality of execution nodes; identifying, by the computing cluster, one or more errors in the application received by the computing cluster; in response to the one or more errors, receiving, by the driver node, telemetry metadata for access to a telemetry network service of a distributed database that provides data to the computing cluster through a database connector, the driver node receiving the telemetry metadata through the database connector of the distributed database; and distributing, by the driver node, the telemetry metadata to the plurality of execution nodes for re-processing.

Example 20. The machine storage medium of example 19, the operations further comprising: re-processing, by the plurality of execution nodes, the tasks of the application; and transmitting, by the plurality of execution nodes, to the telemetry network service of the distributed database, log data that is generated by the plurality of execution nodes while re-processing the tasks of the application.

What is claimed is:

1. A method comprising:
    receiving, by a computing cluster, an application for processing by nodes of the computing cluster, the nodes including a driver node and execution nodes for processing of tasks of the application;
    receiving, by the driver node, telemetry metadata for access to a telemetry network service of a distributed database that provides data to the computing cluster through one or more database connectors;
    distributing, by the driver node, the telemetry metadata to the execution nodes;
    generating, by the execution nodes, log data by processing the tasks of the application using the data from the distributed database, the log data comprising error data generated by one or more of the execution nodes when processing the tasks of the application;
    determining that a telemetry setting in the application is active, the low data not being sent by the computing cluster to the telemetry network service while the telemetry setting is inactive; and
    in response to determining that the telemetry setting in the application is active, transmitting, by the execution nodes, the log data to the distributed database, the execution nodes using the telemetry metadata to transmit the log data through the one or more database connectors to the telemetry network service of the distributed database.

2. The method of claim 1, further comprising:
    transmitting, by the driver node, to the telemetry network service of the distributed database, additional log data that is generated by the driver node while processing the application.

3. The method of claim 2, wherein the additional log data is transmitted to the telemetry network service by a driver database connector integrated in the driver node.

4. The method of claim 1, further comprising:
in response to the telemetry setting being active, requesting, by the driver node, the telemetry metadata from the distributed database.

5. The method of claim 1, wherein the telemetry network service is an electronic message network service of one or more servers of the distributed database.

6. A system comprising:
one or more processors of a machine; and
a memory storing instructions that, when executed by the one or more processors, cause the machine to perform operations comprising:
receiving, by a computing cluster, an application for processing by nodes of the computing cluster, the nodes including a driver node and execution nodes for processing of tasks of the application;
receiving, by the driver node, telemetry metadata for access to a telemetry network service of a distributed database that provides data to the computing cluster through one or more database connectors;
distributing, by the driver node, the telemetry metadata to the execution nodes;
generating, by the execution nodes, log data by processing the tasks of the application using the data from the distributed database, the log data comprising error data generated by one or more of the execution nodes when processing the tasks of the application;
determining that a telemetry setting in the application is active, the log data not being sent by the computing cluster to the telemetry network service while the telemetry setting is inactive; and
in response to determining that the telemetry setting in the application is active, transmitting, by the execution nodes, the log data to the distributed database, the execution nodes using the telemetry metadata to transmit the log data through the one or more database connectors to the telemetry network service of the distributed database.

7. The system of claim 6, the operations further comprising:
transmitting, by the driver node, to the telemetry network service of the distributed database, additional log data that is generated by the driver node while processing the application.

8. The system of claim 7, wherein the additional log data is transmitted to the telemetry network service by a driver database connector integrated in the driver node.

9. The system of claim 6, the operations further comprising:
in response to the telemetry setting being active, requesting, by the driver node, the telemetry metadata from the distributed database.

10. The system of claim 6, wherein the telemetry network service is an electronic message network service of one or more servers of the distributed database.

11. A non-transitory machine storage medium embodying instructions that, when executed by a machine, cause the machine to perform operations comprising:
receiving, by a computing cluster, an application for processing by nodes of the computing cluster, the nodes including a driver node and execution nodes for processing of tasks of the application;
receiving, by the driver node, telemetry metadata for access to a telemetry network service of a distributed database that provides data to the computing cluster through one or more database connectors;
distributing, by the driver node, the telemetry metadata to the execution nodes;
generating, by the execution nodes, log data by processing the tasks of the application using the data from the distributed database, the log data comprising error data generated by one or more of the execution nodes when processing the tasks of the application;
determining that a telemetry setting in the application is active, the log data not being sent by the computing cluster to the telemetry network service while the telemetry setting is inactive; and
in response to determining that the telemetry setting in the application is active, transmitting, by the execution nodes, the log data to the distributed database, the execution nodes using the telemetry metadata to transmit the log data through the one or more database connectors to the telemetry network service of the distributed database.

12. The non-transitory machine storage medium of claim 11, the operations further comprising:
transmitting, by the driver node, to the telemetry network service of the distributed database, additional log data that is generated by the driver node while processing the application.

13. The non-transitory machine storage medium of claim 12, wherein the additional log data is transmitted to the telemetry network service by a driver database connector integrated in the driver node.

14. The non-transitory machine storage medium of claim 11, the operations further comprising:
in response to the telemetry setting being active, requesting, by the driver node, the telemetry metadata from the distributed database.

15. The non-transitory machine storage medium of claim 11, wherein the telemetry network service is an electronic message network service of one or more servers of the distributed database.

* * * * *

UNITED STATES PATENT AND TRADEMARK OFFICE
CERTIFICATE OF CORRECTION

PATENT NO. : 11,249,850 B1
APPLICATION NO. : 17/399847
DATED : February 15, 2022
INVENTOR(S) : Li et al.

It is certified that error appears in the above-identified patent and that said Letters Patent is hereby corrected as shown below:

On the Title Page

In Column 2, Item (56) under "U.S. Patent Documents", Line 4, delete "2004/0003451" and insert --2004/0034510-- therefor In Column 2, Item (56) under "Other Publications", Line 2, after "pgs.", insert --"U.S. Appl. No. 17/218,277, Notice of Allowance dated Jun. 21, 2021", 18 pgs.--

In the Claims

In Column 20, Line 53, in Claim 1, delete "low" and insert --log-- therefor

Signed and Sealed this
Tenth Day of May, 2022

Katherine Kelly Vidal
*Director of the United States Patent and Trademark Office*